US00RE36321E

United States Patent [19]

Suzuki et al.

[11] E Patent Number: Re. 36,321

[45] Reissued Date of Patent: Sep. 28, 1999

[54] HEAT-SENSITIVE RECORDING MATERIAL

[75] Inventors: Toshitake Suzuki, Ohtsu; Naoto Arai, Ikeda; Shoji Aoyagi, Suita; Toranosuke Saito, Ibaraki; Masakatu Kitani, Kobe; Takashi Ishibashi, Ibaraki, all of Japan

[73] Assignees: Kansaki Paper Manufacturing Co., Ltd., Tokyo; Sanko Kaihatsu Kagaku Kekyusho Corporation, Osaka, both of Japan

[21] Appl. No.: 07/209,196

[22] Filed: Jun. 20, 1988

Related U.S. Patent Documents

Reissue of:

[64] Patent No.: 4,531,140
Issued: Jul. 23, 1985
Appl. No.: 06/642,816
Filed: Aug. 21, 1984

[30] Foreign Application Priority Data

Sep. 8, 1983 [JP] Japan ..... 58-166011
Jul. 2, 1984 [JP] Japan ..... 59-137565

[51] Int. Cl.[6] ..... B41M 5/18

[52] U.S. Cl. ..... 503/201; 427/150; 427/151; 503/208; 503/209

[58] Field of Search ..... 427/150–152; 428/913, 914; 503/200, 208, 209, 225, 207, 201

[56] References Cited

U.S. PATENT DOCUMENTS 4,251,593 2/1981 Sakamoto et al. ..... 427/151
4,342,473 8/1982 Chang ..... 503/209
4,444,844 4/1984 Kubo et al. ..... 503/208
4,479,138 10/1984 Ikeda et al. ..... 503/208

FOREIGN PATENT DOCUMENTS 0008194 1/1982 Japan ..... 503/209
0014094 1/1982 Japan ..... 503/208
0071191 4/1983 Japan ..... 503/208
0110289 6/1983 Japan ..... 503/209

*Primary Examiner*—B. Hamilton Hess
*Attorney, Agent, or Firm*—Nikaido, Marmelstein, Murray & Oram LLP

[57] ABSTRACT

In a heat-sensitive recording material incorporating a colorless or pale-colored basic dye and a color acceptor which is reactive with the basic dye to form a color when contacted therewith, the recording material characterized in that at least one compound represented by the formula [I] is contained in a heat-sensitive recording layer

[I]

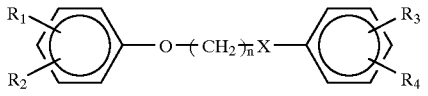

wherein X is —O— or —COO—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and/or $R_2$ or substituents $R_3$ and $R_4$ may link together to form aromatic ring(s), n is an integer of 1 to 10.

15 Claims, No Drawings

HEAT-SENSITIVE RECORDING MATERIAL

Matter enclosed in heavy brackets [ ] appears in the original patent but forms no part of this reissue specification; matter printed in italics indicates the additions made by reissue.

This invention relates to heat-sensitive recording materials, and more particularly to heat-sensitive recording materials having excellent whiteness in a recording layer and suited to high-speed recording.

Heat-sensitive recording materials are well known which are adapted to produce record images by thermally contacting a colorless or pale-colored basic dye with a color acceptor for a color forming reaction. With progress in heat-sensitive recording devices such as heat-sensitive facsimile systems, heat-sensitive printers, etc. using the above heat-sensitive recording materials in recent years, these heat-sensitive recording devices are made operable at a high speed. For use with such high-speed hardware, heat-sensitive recording materials must meet the requirements of having a high recording sensitivity, and many proposals have been made. However, the conventional recording materials have the drawback, for example, that the recording layer decreases in whiteness with an increase in recording sensitivity. For example, many techniques have been proposed to enhance the recording sensitivity by employing a heat-fusible material together with a combination of basic dye and color acceptor. Stearic acid amide, palmitic acid amide and like fatty acid amide are known as the heat-fusible material but these compounds bring the decrease in whiteness of the recording layer. Thus, sufficient results were not so far achieved.

An object of the present invention is to provide a heat-sensitive recording material having an enhanced recording sensitivity without entailing the decrease of whiteness of the recording layer.

Stated specifically, the invention provides a heat-sensitive recording material incorporating a colorless or pale-colored basic dye and a color acceptor which is reactive with the basic dye to form a color when contacted therewith, the recording material being characterized in that at least one compound represented by the formula [I] is contained in a heat-sensitive recording layer

[I]

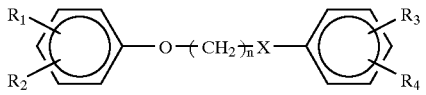

wherein X is —O— or —COO—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and $R_2$ and/or substituents $R_3$ and $R_4$ may link together to form aromatic ring(s), n is an integer of 1 to 10.

In the above, $R_1$ to $R_4$ are preferably each hydrogen atom, alkyl having 1 to 4 carbon atoms, phenyl, benzyl, chlorine atom, methoxy, methylthio, cyano or nitro. Further, n is preferably 1 to 6, more preferably 1 to 4 and most preferably 2 or 4.

Although the reason why the above specific heat-fusible material gives an excellent recording sensitivity without decrease in whiteness is unknown, this feature of the material appears attributable to the fact that it resembles to the basic dye or organic color acceptor in chemical structure and dissolves in the recording layer with an enhanced mutual solubility.

Examples of useful heat-fusible materials are as follows. In parentheses are given melting points of the compounds.

1-Phenoxy-2-naphthoxy(1)-ethane (106° C.) having the formula

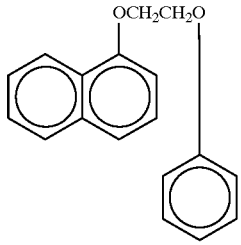

1-Phenoxy-4-naphthoxy(2)-butane (111.5° C.) having the formula

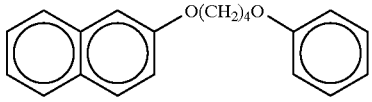

1-(2-Isopropylphenoxy)-2-naphthoxy(2)-ethane (97° C.) having the formula

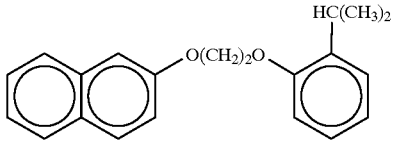

1-(4-Methylphenoxy)-3-naphthoxy(2)-propane (92° C.) having the formula

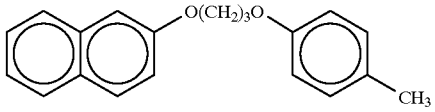

1-(2-Methylphenoxy)-2-naphthoxy(2)-ethane (123° C.) having the formula

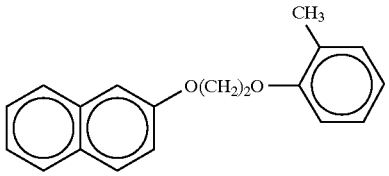

1-(3-Methylphenoxy)-2-naphthoxy(2)-ethane (132.5° C.) having the formula

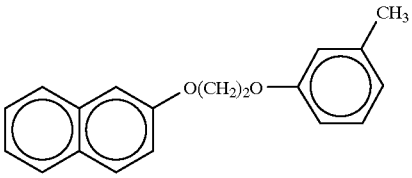

1-Phenoxy-2-naphthoxy(2)-ethane (137° C.) having the formula

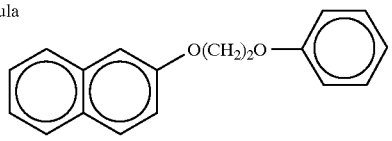

1-Phenoxy-6-naphthoxy(2)-hexane (86° C.) having the formula

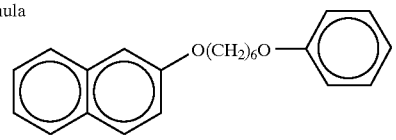

-continued 1-(2-Phenylphenoxy)-2-phenoxyethane (96° C.) having the formula

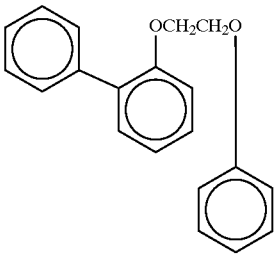

1-(4-Phenylphenoxy)-2-(2-methylphenoxy)ethane (110° C.) having the formula

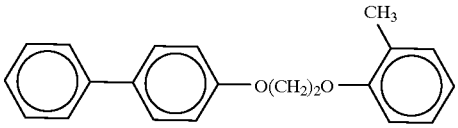

1,4(Diphenoxybutane (99° C.) having the formula

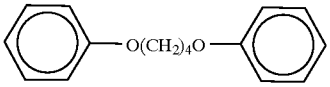

1,4-Di(4-methylphenoxy)butane (104° C.) having the formula

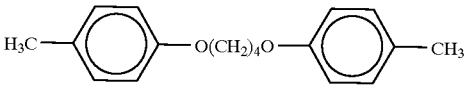

1,2-Di(3,4-dimethylphenoxy)ethane (105° C.) having the formula

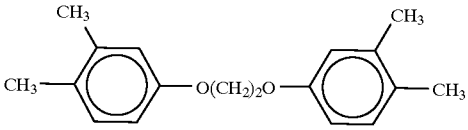

1-(4-Phenylphenoxy)-3-phenoxypropane (94.5° C.) having the formula

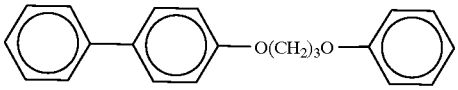

1-Phenoxy-2-(4-tert-butylphenoxy)ethane (93° C.) having the formula

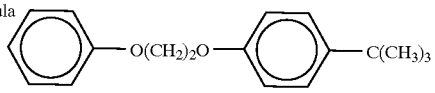

Phenyl 2-naphthoxyacetate (84° C.) having the formula

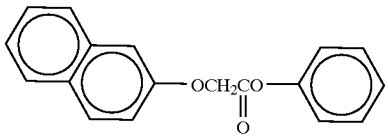

2,5-Dimethylphenyl 2-naphthoxyacetate (82° C.) having the formula

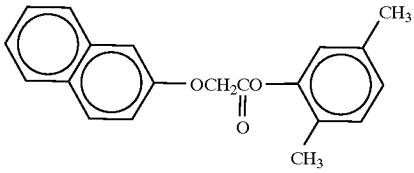

p-Phenylphenyl phenoxyacetate (123° C.) having the formula

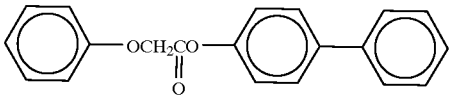

-continued

β-Naphthyl phenoxyacetate (103° C.) having the formula

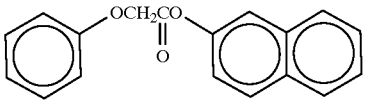

p-Tolyl β-naphthoxyacetate (103° C.) having the formula

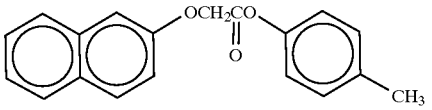

m-Tolyl β-naphthoxyacetate (103° C.) having the formula

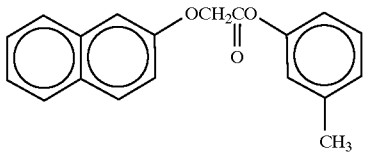

Further, the following compounds are exemplified as the heat-fusible materials of the invention. In parentheses are given melting points of the compounds.

1,2-Diphenoxyethane (96° C.), 1-(2-methylphenoxy)-2-phenoxyethane (71.5° C.), 1-(3-methylphenoxy)-2-phenoxyethane (76° C.), 1-(4-methylphenoxy)-2-phenoxyethane (99.5° C.), 1-(2,3-dimethylphenoxy)-2-phenoxyethane (106° C.), 1-(2,4-dimethylphenoxy)-2-phenoxyethane (76.5° C.), 1-(3,4-dimethylphenoxy)-2-phenoxyethane (101° C.), 1-(3,5-dimethylphenoxy)-2-phenoxyethane (77.5° C.), 1-(4-ethylphenoxy)-2-phenoxyethane (107° C.), 1-(4-isopropylphenoxy)-2-phenoxyethane (94° C.), 1-(4-tert-butylphenoxy)-2-phenoxyethane (92° C.), 1,2-di(2-methylphenoxy)ethane (84° C.), 1-(4-methylphenoxy)-2-(2-methylphenoxy)ethane (88.5° C.), 1-(3,4-dimethylphenoxy)-2-(2-methylphenoxy)ethane (81.5° C.), 1-(4-ethylphenoxy)-2-(2-methylphenoxy)ethane (77° C.), 1-(4-isopropylphenoxy)-2-(2-methylphenoxy)ethane (87° C.), 1-(4-tert-butylphenoxy)-2-(2-methylphenoxy)ethane (96° C.), 1,2-di(3-methylphenoxy)ethane (98° C.), 1-(4-methylphenoxy)-2-(3-methylphenoxy)ethane (94° C.), 1-(2,3-dimethylphenoxy)-2-(3-methylphenoxy)ethane (71° C.), 1-(2,4-dimethylphenoxy)-2-(3-methylphenoxy)ethane (76° C.), 1-(3,4-dimethylphenoxy)-2-(3-methylphenoxy)ethane (78° C.), 1-(4-ethylphenoxy)-2-(3-methylphenoxy)ethane (106° C.), 1-(4-isopropylphenoxy)-2-(3-methylphenoxy)ethane (83.5° C.), 1-(4-tert-butylphenoxy)-2-(3-methylphenoxy)ethane (89.5° C.), 1,2-di(4-methylphenoxy)ethane (135° C.), 1-(2,3-dimethylphenoxy)-2-(4-methylphenoxy)ethane (94° C.), 1-(2,4-dimethylphenoxy)-2-(4-methylphenoxy)ethane (77° C.), 1-(2,5-dimethylphenoxy)-2-(4-methylphenoxy)ethane (93° C.), 1-(3,4-dimethylphenoxy)-2-(4-methylphenoxy)ethane (110° C.), 1-(4-ethylphenoxy)-2-(4-methylphenoxy)ethane (134° C.). 1-(4-isopropylphenoxy)-2-(4-methylphenoxy)ethane (116° C.). 1-(4-tert-butylphenoxy)-2-(4-methylphenoxy)ethane (118° C.), 1,2-di(2,3-dimethylphenoxy)ethane (120° C.), 1-(2,5-dimethylphenoxy)-2-(2,3-dimethylphenoxy)ethane (87.5° C.), 1,2-di(2,4-dimethylphenoxy)ethane (111.5° C.), 1-(4-ethylphenoxy)-2-(2,4-dimethylphenoxy)ethane (72° C.), 1-(4-tert-butylphenoxy)-2-(2,4-dimethylphenoxy)ethane (82° C.), 1,2-di(2,5-dimethylphenoxy)ethane (80° C.), 1-(3,4-dimethylphenoxy)-2-(2,5-dimethylphenoxy)ethane (86° C.), 1-(4-ethylphenoxy)-2-(2,5-dimethylphenoxy)ethane (99.5° C.), 1-(4-tert-butylphenoxy)-2-(2,5-dimethylphenoxy)ethane (86° C.), 1,2-di(3,4-methylphenoxy)ethane (105° C.), 1,2-di(3,5-dimethylphenoxy)ethane (97.5° C.), 1,2-di(4-ethylphenoxy) ethane (151.5° C.), 1,3-di(4-methylphenoxy)propane (93.5° C.), 1-(4-methylphenoxy)-2-naphthoxy(1)-ethane (84.5° C.), 1-(2,5-dimethylphenoxy)-2-naphthoxy(1)-ethane (112° C.), 1,2-dinaphthoxy(1)-ethane (129° C.).

1-(2-Chlorophenoxy)-2-phenoxyethane (81° C.), 1-(2-chlorophenoxy)-2-(2-methylphenoxy)ethane (87° C.), 1-(2-chlorophenoxy)-2-(3-methylphenoxy)ethane (85° C.), 1-(2-chlorophenoxy)-2-(4-methylphenoxy)ethane (89° C.), 1-(4-chlorophenoxy)-2-phenoxyethane (100° C.), 1-(4-chlorophenoxy)-2-(2-methylphenoxy)ethane (81.5° C.). 1-(4-chlorophenoxy)-2-(3-methylphenoxy)ethane (79.5° C.), 1-(4-chlorophenoxy)-2-(4-methylphenoxy)ethane (132° C.), 1-(4-acetylphenoxy)-2-phenoxyethane (139° C.), 1-(4-acetylphenoxy)-2-(2-metylphenoxy)ethane (119.5° C.), 1-(4-propionylphenoxy)-2-phenoxyethane (120° C.), 1-(2-methoxyphenoxy)-2-(4-methylphenoxy)ethane (89° C.), 1-(3-methoxyphenoxy)-2-(4-methylphenoxy)ethane (75° C.), 1,2-di(4-methoxyphenoxy)ethane (128° C.), 1-(4-methoxyphenoxy)-2-phenoxyethane (103° C.), 1-(4-methoxyphenoxy)-2-(2-methylphenoxy)ethane (80° C.), 1-(4-methoxyphenoxy)-2-(3-methylphenoxy)ethane (112° C.), 1-(4-methoxyphenoxy)-2-(4-methylphenoxy)ethane (129° C.), 1-(4-methylthiophenoxy)-2-phenoxyethane, (112° C.), 1-(4-methoxycarbonylphenoxy)-2-phenoxyethane (106° C.), 1-(4-cyanophenoxy)-2-phenoxyethane (110° C.), 1-(4-cyanophenoxy)-2-(2-methylphenoxy)ethane (98° C.), 1-(4-cyanophenoxy)-2-(3-methylphenoxy)ethane (96.5° C.), 1-(4-cyanophenoxy)-2-(4-methylphenoxy)ethane (111.5° C.), 1-(4-nitrophenoxy)-2-phenoxyethane (87° C.), 1-(4-nitrophenoxy)-2-(4-methylphenoxy)ethane (103° C.), 1-(4-cycloheyenylphenoxy)-2-phenoxyethane (116° C.), 1-(4-chlorophenoxy)-2-(4-tert-butylphenoxy)ethane (111° C.), 1-(4-methoxyphenoxy)-2-(4-tert-butylphenoxy)ethane 109.5° C.), 1-(4-acetylphenoxy)-2-(4-tert-butylphenoxy) ethane (101.5° C.), 1-(4-methylthiophenoxy)-2-(4-tert-butylphenoxy)ethane (98° C.). 1-(4-acetylphenoxy)-4-phenoxybutane (106° C.), 1-(4-methoxyphenoxy)-4-phenoxybutane (100° C.), 1-(4-methylthiophenoxy)-4-phenoxybutane (109° C.), 1-(4-cyanophenoxy)-4-phenoxybutane (72° C.), etc. These heat-fusible materials can generally be prepared by Williamson's synthesis of ether and are usable singly or a mixture of at least two of them. Further, the heat-fusible materials of the invention preferably have melting points in the range of 70° to 130° C.

Further, to the recording layer may be added in an amount which does not cause adverse effect, fatty acid amide such as stearic acid amide, stearic acid methylenebisamide, oleic acid amide, palmitic acid amide, coconut fatty acid amide, etc; hindered phenols such as 2,2'-methylene-bis(4-methyl-6-tert-butylphenol), 4,4'-butylidene-bis(6-tert-butyl-3-methylphenol), 1,1,3-tris(2-methyl-4-hydroxy-5-tert-butylphenyl)butane, etc.; ultraviolet absorbers such as 2-(2'-hydroxy-5'-methylphenyl)benzotriazole, 2-hydroxy-4-benzyloxybenzophenone; etc.; and various known heat-fusible substances. The amount to be used of the above heat-fusible materials having the specific structure is not particularly limited but is usually 10 to 1000 parts by weight, preferably 50 to 500 parts by weight per 100 parts by weight of the color acceptor.

Various known colorless or pale-colored basic dyes are used in the recording layer of the present heat-sensitive recording material. Examples of useful dyes are:

Triarylmethane-based dyes, e.g., 3,3-bis(p-dimethylaminophenyl)-6-dimethylaminophthalide, 3,3-bis(p-dimethylaminophenyl)phthalide, 3-(p-dimethylaminophenyl)-3-(1,2-dimethylindole-3-yl) phthalide, 3-(p-dimethylaminophenyl)-3-(2-methylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-6-dimethylaminophthalide, 3,3-bis(2-phenylindole-3-yl)-6-dimethylaminophthalide, 3-p-dimethylaminophenyl-3-(1-methylpyrrole-3-yl)-6-dimethylaminophthalide, etc.

Diphenylmethane-based dyes, e.g., 4,4'-bis-dimethylaminobenzhydryl benzyl ether, N-halophenyl-leucoauramine, N-2,4,5-trichlorophenyl-leucoauramine, etc.

Thiazine-based dyes, e.g., benzoyl-leucomethyleneblue, p-nitrobenzoyl-leucomethyleneblue, etc.

Spiro-based dyes, e.g., 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho-(6'-methoxybenzo)spiropyran, 3-propyl-spiro-dibenzopyran, etc.

Lactam-based dyes, e.g., rhodamine-B-anilinolactam, rhodamine-(p-nitroanilino)lactam, rhodamine-(o-chloroanilino)lactam, etc.

Fluoran-based dyes, e.g., 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-(N-acetyl-N-methylamino)fluoran, 3-diethylamino-7-N-methylaminofluoran, 3-diethylamino-7-dibenzylaminofluoran, 3-diethylamino-7-(N-methyl-N-benzylamino)fluoran, 3-diethylamino-7-(N-chloroethyl-N-methylamino)fluoran, 3-diethylamino-7-N-diethylaminofluoran, 3-(N-ethyl-p-toluidino)-6-methyl-7-phenylaminofluoran, 3-(N-ethyl-p-toluidino)-6-methyl-7-(p-toluidino)fluoran, 3-diethylamino-6-methyl-7-phenylaminofluoran, 3-dibutylamino-6-methyl-7-phenylaminofluoran, 3-diethylamino-7-(2-carbomethoxyphenylamino)fluoran, 3-(N-cyclohexyl-N-methylamino)-6-methyl-7-phenylaminofluoran, 3-pyrrolidino-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, 3-pyrrolidino-6-methyl-7-p-butylphenylaminofluoran, 3-(N-methyl-N-n-amylamino)-6-methyl-7-phenylaminofluoran, 3-(N-ethyl-N-n-amylamino)-6-methyl-7-phenylaminofluoran, 3-(N-ethyl-N-isoamylamino)-6-methyl-7-phenylaminofluoran, 3-(N-methyl-N-n-hexylamino)-6-methyl-7-phenylaminofluoran, 3-(N-ethyl-N-n-hexylamino)-6-methyl-7-phenylaminofluoran, 3-(N-ethyl-N-β-ethyl-hexylamino)-6-methyl-7-phenylaminofluoran, etc.

In the invention, the color acceptor which is used in combination with the above basic dye is not particularly limited. Various color acceptors can be employed which are fusible or vaporous by heating and produce record images by contact with the basic dye. Examples of useful color acceptors are 4-tert-butylphenol, α-naphthol, β-naphthol, 4-acetylphenol, 4-tert-octylphenol, 4,4'-sec-butylidenediphenol, 4-phenylphenol, 4,4'-dihydroxy-diphenylmethane 4,4'-isopropylidenediphenol, hydroquinone, 4,4'-cyclohexylidenediphenol, 4,4'-dihydroxydiphenylsulfide, 4,4'-thiobis(6-tert-butyl-3-methylphenol), 4,4'-dihydroxy-diphenylsulfone, hydroquinone monobenzyl ether, 4-hydroxybenzophenone, 2,4-dihydroxybenzophenone, 2,4,4'-trihydroxybenzophenone, 2,2',4,4'-tetrahydroxybenzophenone, dimethyl 4-hydroxyphthalate, methyl 4-hydroxybenzoate, ethyl 4-hydroxybenzoate, propyl 4-hydroxybenzoate, sec-butyl 4-hydroxybenzoate, pentyl 4-hydroxybenzoate, phenyl 4-hydroxybenzoate, benzyl 4-hydroxybenzoate, tolyl 4-hydroxybenzoate, chlorophenyl 4-hydroxybenzoate, phenylpropyl 4-hydroxybenzoate, phenethyl 4-hydroxybenzoate, p-chlorobenzyl 4-hydroxybenzoate, p-methoxybenzyl 4-hydroxybenzoate, novolak phenol resin, phenolic polymer and like phenolic compounds; benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl)salicylic acid, 3-chloro-5-(α-methylbenzyl) salicylic acid, 3,5-di-tert-butylsalicylic acid, 3-phenyl-5-(α,α-dimethylbenzyl)salicylic acid, 3,5-di-α-methylbenzylsalicylic acid and like aromatic carboxylic acids; also, salts of such phenolic compounds or aromatic carboxylic acids with zinc, magnesium, aluminum, calcium, titanium, manganese, tin, nickel and like polyvalent metals, etc.

With the heat-sensitive recording materials of the invention, the proportions of basic dye and color acceptor to be used for the recording layer are usually 100 to 700 parts by weight, preferably 150 or 400 parts by weight, of the latter per 100 parts by weight of the former. Each of the basic dye and the color acceptor can be used singly or in mixture of at least two of them.

For preparing a coating composition comprising the foregoing components, the basic dye, the color acceptor and the heat-fusible material are dispersed, together or individually, into water serving as a dispersion medium, using stirring and pulverizing means such as a ball mill, attritor or sand mill. Usually the coating composition has incorporated therein a binder in an amount of 2 to 40% by weight, preferably 5 to 25% by weight, based on the total solids content of the composition. Examples of useful binders are starches, hydroxyethyl cellulose, methyl cellulose, carboxymethyl cellulose, gelatin, casein, gum arabic, polyvinyl alcohol, styrene-maleic anhydride copolymer salt, styrene-butadiene copolymer emulsion, etc.

Various other auxiliary agents, as required, can be further added to the coating composition. Examples of useful agents are dispersants such as sodium dioctylsulfosuccinate, sodium dodecylbenzenesulfonate, sodium salt of lauryl alcohol sulfuric acid ester, fatty acid metal salts, etc., defoaming agents, fluorescent dyes, coloring dyes, etc.

In addition, to the composition may be added in order to prevent the adhesion of tailings to the thermal head face and improve the whiteness of the recording layer, inorganic pigment such as kaolin, clay, talc, calcium carbonate, calcined clay, titanium oxide, kieselguhr, finely divided anhydrous silica, activated clay, etc.

Further, to the composition may be added, in order to prevent sticking upon contact of the heat-sensitive recording layer with a recording device or thermal head, a dispersion or emulsion of stearic acid, polyethylene, carnauba wax, paraffin wax, calcium stearate, zinc stearate, ester wax or the like.

The method of forming the recording layer of the heat-sensitive recording material of the invention is not particularly limited, but conventional techniques are usable. For example, the coating composition is applied to a substrate by an air knife coater, blade coater or like suitable means. The amount of coating composition to be applied, which is not limited particularly, is usually 2 to 12 g/m$^2$, preferably 3 to 10 g/m$^2$, based on dry weight.

As a substrate (support) to be coated, may be used a paper, synthetic fiber paper, plastic film or the like, but a paper is most preferably used.

Further, it is possible to form an over-coat layer on the recording layer to protect the layer. Various other known techniques in the field of heat-sensitive recording material can be applied. For example, it is possible to form a primary coating layer on the support.

The heat-sensitive recording materials thus obtained suited to high-speed recording, have excellent whiteness and have a well-balanced characteristics in qualities.

The invention will be described below in more detail with reference to Examples and Comparison Examples by no means limited to, in which parts and percentages are all by weight, unless otherwise specified.

EXAMPLE 1

(1) Composition (A)

3-(N-cyclohexyl-N-methylamino)-6-methyl-7-phenylaminofluoran (10 parts), 20 parts of 1-phenoxy-2-naphthoxy(1)-ethane, 15 parts of 5% aqueous solution of methyl cellulose and 120 parts of water were pulverized by a sand mill to prepare Composition (A) having an average particle size of 3 μm.

(2) Composition (B)

4,4'-Isopropylidenediphenol (30 parts), 30 parts of 5% aqueous solution of methyl cellulose and 70 parts of water were pulverized by a sand mill to obtain Composition (B) having an average particle size of 3 μm.

(3) Preparation of a recording layer

A 165-part quantity of Composition (A), 130 parts of Composition (B), 30 parts of finely divided anhydrous silica, 150 parts of 20% aqueous solution of oxidized starch and 55 parts of water were mixed with stirring to prepare a coating composition. The coating composition was applied to a paper substrate weighing 50 g/m$^2$ in an amount of 7.5 g/m$^2$ by dry weight to prepare a heat-sensitive recording paper.

EXAMPLE 2

A heat-sensitive recording paper was prepared in the same manner as in Example 1 except that 1-(2-isopropylphenoxy)-2-naphthoxy(2)-naphthoxy(2)-ethane was used in place of 1-phenoxy-2-naphthoxy(1)-ethane in the preparation of Composition (A).

EXAMPLE 3

A heat-sensitive recording paper was prepared in the same manner as in Example 1 except that 1-(2-phenylphenoxy)-2-phenoxyethane was used in place of 1-phenoxy-2-naphthoxy(1)-ethane in the preparation of Composition (A).

EXAMPLE 4

A heat-sensitive recording paper was prepared in the same manner as in Example 1 except that 1-(4-phenylphenoxy)-2-(2-methylphenoxy)ethane was used in place of 1-phenoxy-2-naphthoxy(1)-ethane in the preparation of Composition (A).

EXAMPLES 5 AND 6

A heat-sensitive recording paper was prepared in the same manner as in Example 1 except that 1,4-diphenoxybutane (Example 5) or 1,4-di(4-methylphenoxy)butane (Example 6) was used in place of 1-phenoxy-2-naphthoxy(1)-ethane in the preparation of Composition (A).

EXAMPLES 7 TO 14

A heat-sensitive recording paper was prepared in the same manner as in Example 1 except that 1,2-diphenoxyethane (Example 7), 1-(4-methylphenoxy)-2-phenoxyethane (Example 8), 1-(3,4-dimethylphenoxy)-2-phenoxyethane (Example 9), 1,2-di(3-methylphenoxy)ethane (Example 10), 1-(4-methylphenoxy)-2-(3-methylphenoxy)ethane (Example 11), 1-(3,4-dimethylphenoxy)-2-(4-methylphenoxy)ethane (Example 12), 1-(2,5-dimethylphenoxy)-2-(4-methylphenoxy)ethane (Example 13) or 1,2-di(2,4-dimethylphenoxy)ethane (Example 14) was used in place of 1-phenoxy-2-naphthoxy(1)ethane in the preparation of Composition (A).

EXAMPLE 15 TO 17

A heat-sensitive recording paper was prepared in the same manner as in Example 1 except that 1-(4-ethylphenoxy)-2-(3-methylphenoxy)ethane (Example 15), 1-(4-isopropylphenoxy)-2-phenoxyethane (Example 16) or 1-phenoxy-2-(4-tert-butylphenoxy)ethane (Example 17) was used in place of 1-phenoxy-2-naphthoxy(1)-ethane in the preparation of Composition (A).

EXAMPLE 18

A heat-sensitive recording paper was prepared in the same manner as in Example 1 except that β-naphthyl phenoxyacetate was used in place of 1-phenoxy-2-naphthoxy(1)-ethane in the preparation of Composition (A).

EXAMPLE 19

A heat-sensitive recording paper was prepared in the same manner as in Example 1 except that p-tolyl β-naphthoxyacetate was used in place of 1-phenoxy-2-naphthoxy(1)-ethane in the preparation of Composition (A).

EXAMPLE 20

A heat-sensitive recording paper was prepared in the same manner as in Example 1 except that 1-(4-methoxyphenoxy)-2-phenoxyethane was used in place of 1-phenoxy-2-naphthoxy(1)-ethane in the preparation of Composition (A).

EXAMPLE 21

A heat-sensitive recording paper was prepared in the same manner as in Example 1 except that 1-(4-chlorophenoxy)-2-phenoxyethane was used in place of 1-phenoxy-2-naphthoxy(1)-ethane in the preparation of Composition (A).

EXAMPLE 22

A heat-sensitive recording paper was prepared in the same manner as in Example 1 except that 1-(4-cyanophenoxy)-2-(2-methylphenoxy)ethane was used in place of 1-phenoxy-2-naphthoxy(1)-ethane in the preparation of Composition (A).

EXAMPLE 23

A heat-sensitive recording paper was prepared in the same manner as in Example 1 except that 1,2-di(3-methylphenoxy)ethane was used in place of 1-phenoxy-2-naphthoxy(1)-ethane in the preparation of Composition (A), and benzyl p-hydroxybenzoate was used in place of 4,4'-isopropylidenediphenol in the preparation of Composition (B).

COMPARISON EXAMPLE 1

A heat-sensitive recording paper was prepared in the same manner as in Example 1 except that stearic acid amide was used in place of 1-phenoxy-2-naphthoxy(1)-ethane in the preparation of Composition (A).

COMPARISON EXAMPLE 2

A heat-sensitive recording paper was prepared in the same manner as in Example 1 except that stearic acid amide was used in place of 1-phenoxy-2-naphthoxy(1)-ethane in the preparation of Composition (A), and benzyl p-hydroxybenzoate was used in place of 4,4'-isopropylidenediphenol in the preparation of Composition (B).

The 25 kinds of beat-sensitive recording papers thus prepared were checked for recording sensitivity and whiteness of recording layer. The results were shown in Table 1 below. The recording sensitivity was evaluated by feeding the paper to a high-speed heat-sensitive facsimile system (Hitachi HIFAX-700 Model, G III type, a product of Hitachi Ltd.) for recording and checked for color density by Macbeth densitometer (Model RD-100R, a product of Macbeth Corp.). The whiteness was given with use of a Hunter multipurpose reflectometer before the recording.

TABLE 1

| | Recording Sensitivity | White-ness | | Recording Sensitivity | White-ness |
|---|---|---|---|---|---|
| Ex. 1 | 1.15 | 81.0 | Ex. 14 | 1.03 | 81.5 |
| Ex. 2 | 1.05 | 80.5 | Ex. 15 | 1.18 | 81.2 |
| Ex. 3 | 1.05 | 80.6 | Ex. 16 | 1.20 | 81.3 |
| Ex. 4 | 1.02 | 81.5 | Ex. 17 | 1.19 | 80.3 |
| Ex. 5 | 1.08 | 80.8 | Ex. 18 | 1.13 | 80.7 |
| Ex. 6 | 1.18 | 81.3 | Ex. 19 | 1.15 | 80.5 |
| Ex. 7 | 1.28 | 81.0 | Ex. 20 | 1.20 | 80.5 |
| Ex. 8 | 1.25 | 80.8 | Ex. 21 | 1.23 | 81.0 |
| Ex. 9 | 1.19 | 81.0 | Ex. 22 | 1.18 | 81.5 |
| Ex. 10 | 1.23 | 81.1 | Ex. 23 | 1.30 | 81.0 |
| Ex. 11 | 1.24 | 81.0 | | | |
| Ex. 12 | 1.04 | 81.3 | Com. Ex. 1 | 1.70 | 80.0 |
| Ex. 13 | 1.20 | 80.7 | Com. Ex. 2 | 1.10 | 80.3 |

We claim:

1. In a heat-sensitive recording material *comprising a heat-sensitive recording layer* incorporating a colorless or pale-colored basic dye, and a color acceptor which is reactive with the basic dye to form a color when contacted therewith, the recording material characterized in that at least one compound represented by the formula [I] is contained in the heat-sensitive recording layer

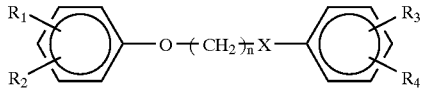

(I)

wherein X is —O— [or —COO—], $R_1$ to $R_4$ are each a hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and[/or] $R_2$ *and*/or substituents $R_3$ and $R_4$ may link together to form aromatic ring(s), and n is an integer of 1 to 10, *wherein said recording layer is deposited on a substrate.*

2. A heat-sensitive recording material as defined in claim 1 wherein X is —O— [or —COO—], $R_1$ to $R_4$ are each hydrogen atom, alkyl having 1 to 4 carbon atoms, phenyl, benzyl, chlorine atom, methoxy, methylthio, cyano or nitro, substituents $R_1$ and $R_2$ and/or substituents $R_3$ and $R_4$ may link together to form aromatic ring(s).

3. A heat-sensitive recording material as defined in claim 2 wherein X is oxygen atom.

4. A heat-sensitive recording material as defined in claim 1 wherein the compound represented by the formula [I] is used in an amount of 10 to 1000 parts by weight per 100 parts by weight of the color acceptor.

5. A heat-sensitive recording material as defined in claim 1 wherein the color acceptor is used in an amount of 100 to 700 parts by weight per 100 parts by weight of the basic dye.

*6. In a heat-sensitive recording material comprising a substrate and a heat-sensitive recording layer deposited on said substrate, wherein the heat-sensitive recording layer comprises a colorless or pale-colored basic dye and a color acceptor which is thermally reactive with said dye to form a color record when thermally activated; the improvement comprising, in said heat-sensitive recording layer, at least one recording sensitivity enhancing compound according to the formula (I);*

(I)

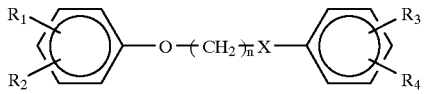

*wherein X is —O—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and $R_2$ and/or substituents $R_3$ and $R_4$ may link together to form aromatic ring(s), n is an integer of 1 to 10; wherein said basic dye, said color acceptor and said at least one recording sensitivity enhancing compound are deposited on the substrate in the form of fine particles.*

*7. In a color record, corresponding to a thermal contact with a thermally sensitive recording material comprising a substrate having a thermally sensitive recording layer disposed thereon; wherein said color record comprises the thermal reaction product of a colorless or pale-colored basic dye with a color acceptor thermally reactive therewith; the improvement comprising, in said thermally sensitive recording layer, a sensitivity enhancing quantity of at least one compound according to the formula (I);*

(I)

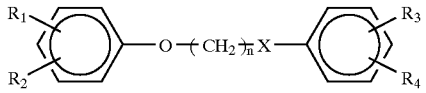

*wherein X is —O—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and $R_2$ and/or substituents $R_3$ and $R_4$ may link together to form aromatic ring(s), n is an integer of 1 to 10.*

*8. In a heat-sensitive recording material, having improved recording sensitivity, consisting essentially of a substrate having deposited thereon a heat-sensitive recording layer comprising colorless or pale-colored basic dye, a color acceptor thermally reactive therewith; the improvement comprising, in said heat-sensitive recording layer, a sensitivity enhancing quantity of at least one compound according to the formula (I);*

(I)

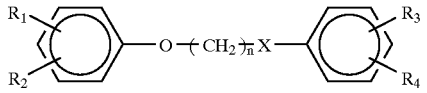

*wherein X is —O—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and $R_2$ and/or substituents $R_3$ and $R_4$ may link together to form aromatic ring(s), n is an integer of 1 to 10.*

*9. A heat sensitive recording material as claimed in claim 8 wherein said heat-sensitive recording layer further includes a binder.*

*10. A heat-sensitive recording material as claimed in claim 8 wherein said heat-sensitive recording layer further includes at least one auxiliary material in an amount which does not cause adverse effects.*

*11. A heat-sensitive recording material as claimed in claim 8, wherein each of said components of said heat-sensitive recording layer is separately dispersed as fine particles in said recording material.*

*12. In a process of producing record images by:*

*coating a substrate with a heat-sensitive recording layer composition comprising a colorless or pale-colored basic dye and a color acceptor,*

*subjecting said coated substrate to a thermal recording, color forming reaction, and*

*recovering said substrate having thermally recorded images thereon;*

*the improvement which comprises:*

*including in said heat-sensitive recording layer at least one compound represented by the formula (I):*

(I)

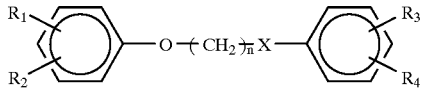

*wherein X is —O—, $R_1$ to $R_4$ are each hydrogen atom, alkyl having 1 to 8 carbon atoms, aryl having 6 to 10 carbon atoms, aralkyl having 7 to 9 carbon atoms, chlorine atom, acetyl, propionyl, methoxy, methylthio, methoxycarbonyl, cyano, nitro or cyclohexenyl, substituents $R_1$ and $R_2$ and/or substituents $R_3$ and $R_4$ may link together to form aromatic ring(s), n is an integer of 1 to 10, thereby providing a recording layer of enhanced recording sensitivity;*

*thermally recording images on said enhanced sensitivity recording layer; and*

*recovering from said thermal recording step said substrate and recording layer thereon of substantially undiminished whiteness having printed thereon thermally recorded images.*

*13. A process of producing record images as claimed in claim 12 wherein said heat-sensitive recording layer further includes a binder.*

*14. A process of producing record images as claimed in claim 12 wherein said heat-sensitive recording layer further includes at least one auxiliary material in an amount which does not cause adverse effects.*

*15. A process of producing record images as claimed in claim 12 wherein each of said components is separately dispersed as fine particles in said recording material.*

* * * * *

UNITED STATES PATENT AND TRADEMARK OFFICE

CERTIFICATE OF CORRECTION

PATENT NO. : RE 36,321

DATED : September 28, 1999

INVENTOR(S) : Toshitake Suzuki, Naoto Arai, Shoji Aoyagi, Toranosuke Saito, Masakatu Kitani, Takashi Ishibashi It is certified that error appears in the above-identified patent and that said Letters Patent is hereby corrected as shown below:

On the title page, item [73],

Delete "Kansaki Paper Manufacturing Co., Ltd., Tokyo" and insert therefor --Oji Paper Co., Ltd., Tokyo-to--.

Cancel claim 3 without prejudice.

Column 10, line 53, after "by the formula", delete "[I]" and insert therefor --(I)--.

Column 11, line 13, after "by the formula", delete "[I]" and insert therefor --(I)--.

Column 11, line 17, after "color acceptor is", delete "used".

Column 12, line 4, before "colorless or pale-colored", insert --a--.

Column 14, line 7, after "said recording", delete "material" and insert therefor --layer--.

Signed and Sealed this

Fifteenth Day of August, 2000

*Attest:*

*Attesting Officer*

Q. TODD DICKINSON

*Director of Patents and Trademarks*